United States Patent
Kosmicki et al.

(10) Patent No.: US 11,369,053 B2
(45) Date of Patent: Jun. 28, 2022

(54) IMPLEMENT HITCH WITH VARIABLE VERTICAL LOAD

(71) Applicant: Deere & Company, Moline, IL (US)

(72) Inventors: Peter A. Kosmicki, Cedar Falls, IA (US); Benjamin J. Heimbuch, Cedar Falls, IA (US); Lee R. Rients, Parkersburg, IA (US); Kendall L. Giesmann, Waverly, IA (US)

(73) Assignee: Deere & Company, Moline, IL (US)

(*) Notice: Subject to any disclaimer, the term of this patent is extended or adjusted under 35 U.S.C. 154(b) by 216 days.

(21) Appl. No.: 16/736,035

(22) Filed: Jan. 7, 2020

(65) Prior Publication Data

US 2021/0204463 A1  Jul. 8, 2021

(51) Int. Cl.
*A01B 59/042* (2006.01)
*A01B 63/14* (2006.01)

(52) U.S. Cl.
CPC .......... *A01B 59/042* (2013.01); *A01B 63/14* (2013.01)

(58) Field of Classification Search
CPC ....... A01B 59/00; A01B 59/002; A01B 59/04; A01B 59/042; A01B 59/062; A01B 63/11; A01B 63/1145; A01B 63/14; A01B 63/145
See application file for complete search history.

(56) References Cited

U.S. PATENT DOCUMENTS

| | | | |
|---|---|---|---|
| 7,458,428 B2 | 12/2008 | Laudick et al. | |
| 9,228,322 B2 | 1/2016 | Keys, II et al. | |
| 2015/0053435 A1 | 2/2015 | Romig et al. | |
| 2016/0039480 A1 | 2/2016 | Pichlmaier | |
| 2018/0213712 A1* | 8/2018 | Kline | A01B 49/02 |
| 2018/0310458 A1 | 11/2018 | Garcia | |

FOREIGN PATENT DOCUMENTS

| | | | |
|---|---|---|---|
| DE | 102017120869 A1 * | 3/2019 | A01B 59/042 |
| EP | 3245857 A1 * | 11/2017 | A01D 80/00 |
| WO | WO-2019079901 A * | 5/2019 | A01B 59/042 |

* cited by examiner

*Primary Examiner* — Tara Mayo-Pinnock
(74) *Attorney, Agent, or Firm* — Tucker Ellis LLP; Michael G. Craig; Heather M. Barnes

(57) ABSTRACT

One or more techniques and/or systems are disclosed for adjusting the downward vertical force applied to the vehicle frame. In this way, an operator can adjust or distribute a vertical downward force that an attached implement applies to the frame of a vehicle towing the implement. A front end of a vertical load member can be pivotably coupled to the vehicle frame at a point in front of the rear axle of the vehicle, and a rear end of the vertical load member can be coupled to a hitch attachment assembly, coupled with a towed implement, at a rear end of the vertical load member. An actuator can be pivotably coupled with the vertical load member rearward of the vehicle axle, and to the vehicle frame. The vertical load member can be raised and lowered using the actuator, which raises and lowers the hitch assembly at the rear, and pivots the vertical load member at the front.

20 Claims, 9 Drawing Sheets

IMPLEMENT HITCH WITH VARIABLE VERTICAL LOAD

BACKGROUND

Towed and/or drawbar attached implements, such as those that are attached to an agricultural vehicle or construction vehicle, can impart vertical and draft loads on the vehicle towing the implement. Some implements, such as scrapers, graders, planters, seeders, tillage equipment, carts and the like can impart large vertical loads on the rear axle of the towing vehicle. Typical implement attachments between the vehicle and the implement decrease the load on the front axle, which can decrease tractive efficiency of the front axle, and may result in an increased load to the rear axle. Further, current implement attachment systems have reached the vertical load limits for the rear axles of current tractors, which limits the use of larger or heavier implements.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for a system to adjust or distribute a vertical downward force that an attached implement can apply to the frame of a vehicle towing the implement. The location of the point of downward vertical force applied to the vehicle frame can be moved from behind the rear axle of the vehicle to a position in front of the rear axle. Further, an actuator can be attached to the frame and a vertical load member to raise or lower the vertical load member, to adjust the amount of vertical downward applied to the rear of the vehicle, such as toward the front of the vehicle.

In one implementation of a system for adjusting the downward vertical force applied to the vehicle frame can comprise a vertical load member that comprise a first portion at a front end and a second portion at a rear end. The vertical load member can comprise a frame connection coupler at the first portion to operably, pivotably couple the vertical load member with the vehicle frame in a first pitch axis at a point that is forward of the rear axle of the vehicle. Further, an implement attachment assembly can be disposed at the second portion of the vertical load member, where the implement attachment assembly operably couples with an implement attachment hitch to couple the vertical load member to an implement towed by the vehicle.

In this implementation, a rear actuator can comprise a first end and second end, where the first end is pivotably coupled with the vertical load member between the front end of the front portion and the rear end of the rear portion of the vertical load member in a second pitch axis. The second end of the actuator is operably coupled to the vehicle frame at a point rearward of the rear axle of the vehicle. Further, the actuator is operable to move the vertical load member, resulting in the vertical load member pivoting about the coupling to the vehicle frame at the first portion of the vertical load member. The moving of the vertical load member selectively raises and lowers the implement attachment assembly at the second portion of the vertical load member.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
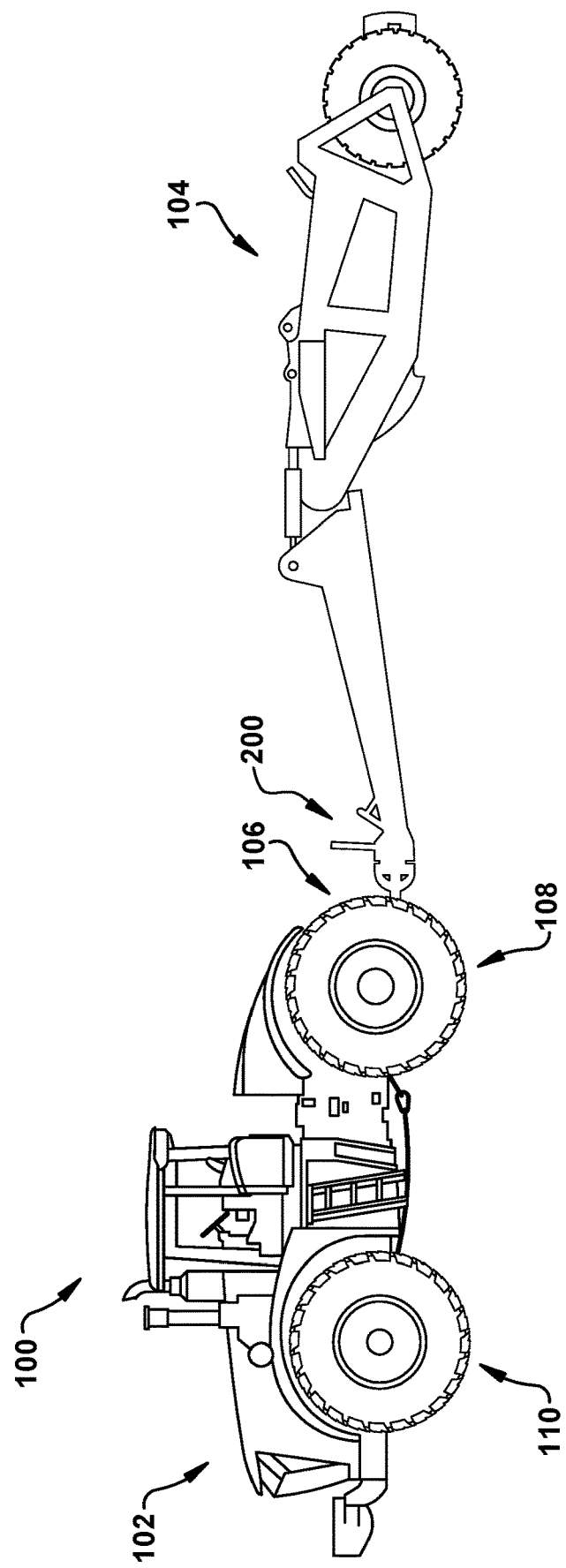
FIG. 1 is a component diagram illustrating an example implementation of a vehicle and implement towing system.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is a component diagrams illustrating an example implementation of a system that may utilize one or more portions of the innovative concepts described herein. In this implementation, as illustrated in FIG. 1, a vehicle 102, such as a tractor, can be coupled with a ground working implement 104, such as a scraper. In this implementation, for example, the implement 104 can be towed behind the vehicle 102 during a ground working operation in a field. In some implementation, as illustrated, the vehicle 102 may have wheels installed. In other implementations the vehicle 102 may have track systems installed on the rear or both the front and rear instead of wheels. Further, the implement 104 can be coupled to the vehicle at a coupling 106, such as using a hitch coupled with a drawbar or implement tongue.

As one example, the vehicle 102, such as a tractor, can be attached to the implement 104, such as one or more scrapers, to perform ground scraping operations to level the ground by moving dirt from one place to another. In this example, the tractor can tow the scraper(s) over the ground, and the height of the scraper, with respect to the ground, can be adjusted to adjust how much dirt is being collected. As the scraper height is lowered a greater amount of dirt is removed, and more dirt is collected in the scraper, for example. This can result in a greater downward vertical force applied at the coupling 106 between the tractor and scraper. In this example, the downward force at the coupling 106 can result in a greater downward vertical force applied to a rear axle 108 of the tractor. In some implementations, the greater downward force at the rear axle 108 can result in an upward vertical force at a front axle 110 of the tractor. As an example, the upward force to the front axle 110 may result in a loss of traction between the tractor tires and the ground, as less tire surface area is in contact with the ground, and less pressure is applied to the ground.

While this example describes a tractor coupling with one or more scrapers, it should be appreciated that the systems and methods described herein may also be utilized with other types of vehicles and implements. For example, the vehicle may comprise another utility-type vehicle, such as a truck, hauler, semi-tractor, or any vehicle that tows an implement that may apply a downward vertical force on the coupling point. Further, for example, the implement may comprise a planter, seeder, tillage implement, grain carts, graders, and other implements that can apply a varying amount of vertical downward force on the coupling with the towing vehicle.

Figure 2:
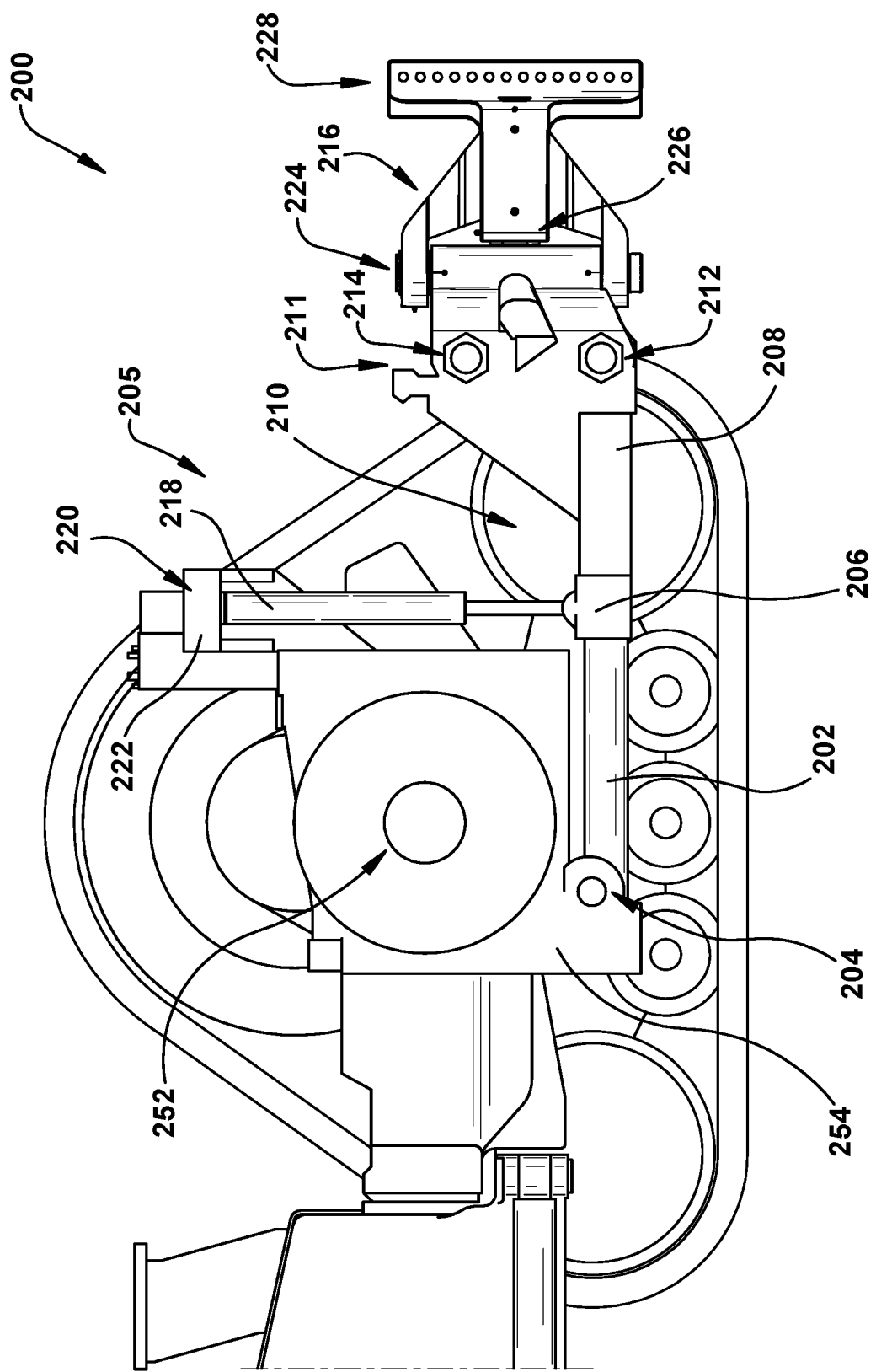
FIG. 2 is a component diagram illustrating an example implementation of one or more portions of a system for varying vertical downward force load.

FIG. 2 is a component diagram illustrating one implementation of one or more portions of an exemplary hitch assembly 200 for coupling an implement to a vehicle, to adjust a vertical load on the rear portion of the vehicle (e.g., 102 of FIG. 1) coupled with the ground working implement (e.g., 104 or FIG. 1). In this implementation, a track system 250 is installed on the rear axle 252 of the vehicle. It should be noted that the exemplary system 200 may also be utilized when a wheel is installed on the vehicle in place of the track system 150.

The exemplary hitch assembly 200 can comprise a vertical load member 210 comprising a first portion 202 at a front end and a second portion 208 at a rear end of the vertical load member 210. The vertical load member 210 can comprise a frame connection coupler 204 at the first portion 202, which is used to couple the member 210 to a portion of the vehicle rear frame 254. The frame connection coupler 204 at the first portion 202 provides a pivotable coupling with the vehicle rear frame 254 in a first pitch axis. As an example, the frame connection coupler 204 can be coupled to the vehicle rear frame 254 using a pin, a fastener, or other mechanical linkage that provides for pivoting in the first pitch axis. Further, the frame connection coupler 204 is configured to be operably, pivotably coupled with a frame of a vehicle 254 at a point that is forward of the rear axle 252 of the vehicle.

In this implementation, the exemplary assembly 200 can comprise an implement attachment assembly 211 disposed at the rear end of the second portion 208, of the vertical load member 210. The implement attachment assembly 211 can operably couple with an implement attachment hitch that couple to the implement towed by the vehicle. For example, the implement attachment assembly 211 can be formed with or fixed to the rear end of the vertical load member 210, so that the vertical load member 210 can be selectively coupled with a hitch that couples to the implement, or selectively couples directly with the implement. In this example, either way, there is typically some sort of hitch disposed between the vertical load member 210 and the implement that allows the two to operably couple, so that the vehicle can tow the implement.

In some implementations, the implement attachment assembly 211 comprises a vertically disposed member, such as a plate, bar, or multiple beams, that comprises a top member to hitch coupling point 214 and a bottom member to hitch coupling point 212. For example, the respective coupling points 212, 214 can receive a pin (e.g., or some other appropriate fastener) that also engages the implement coupling hitch 216 to couple the two together.

Figure 4A:
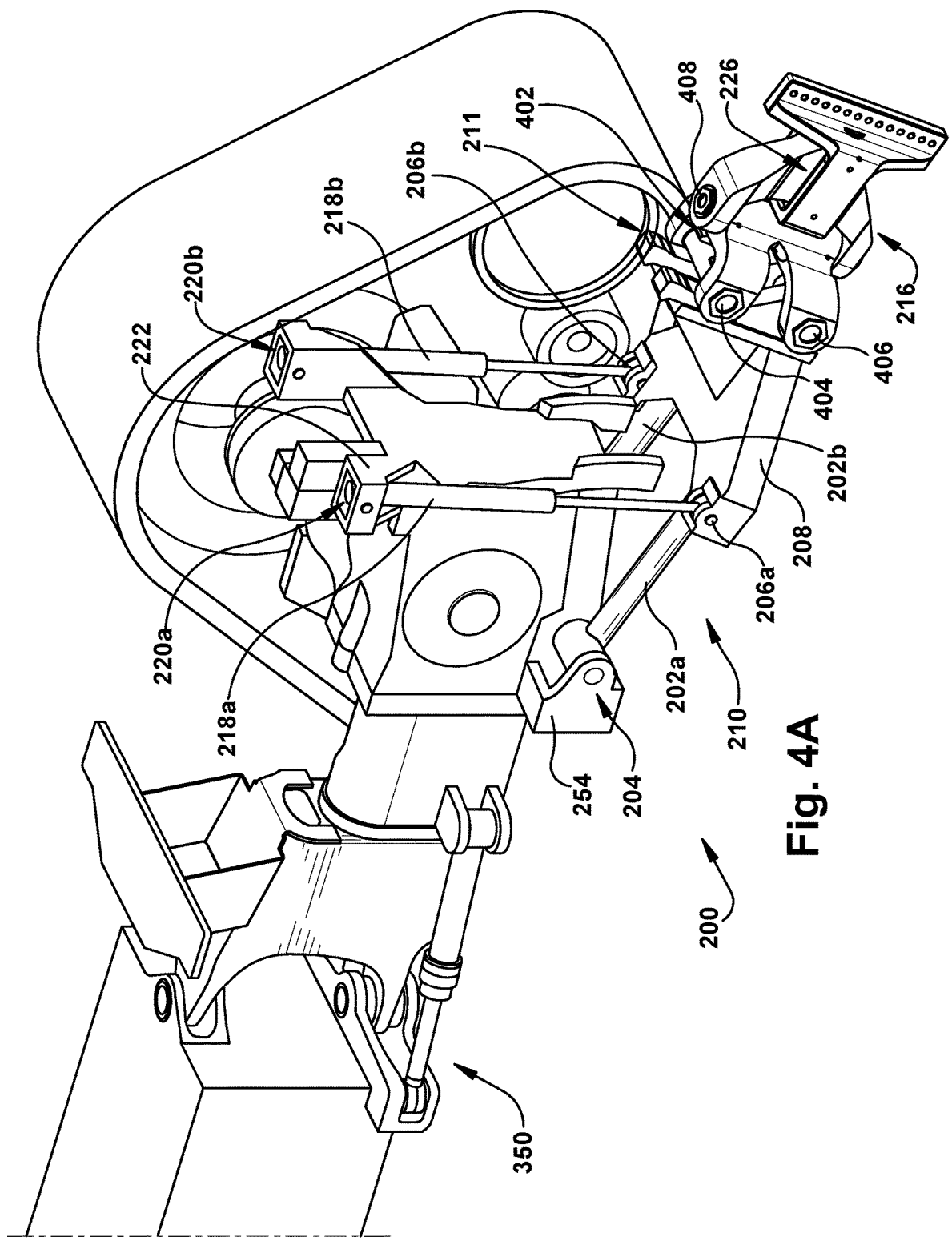
FIGS. 4A and 4B are component diagrams illustrating example implementations of one or more portions of one or more systems described herein.

In one implementation, as illustrated in FIG. 4A, with continued reference to FIG. 2, the top coupling point 214 comprises a hook-shaped member 402 that has a gap between a point and a shank of the hook-shape that is sized to receive the first coupling pin 404. That is, for example, the first coupling pin 404 can be installed in the implement coupling hitch 216, and the pin may be installed onto the hook-shaped member 402 by passing the pin 404 sideways through the gap, to be operably seated in the hook-shaped member 402. Further, in some implementations, the bottom coupling point 212 can comprise a via (e.g., through hole) that is sized to receive the second coupling pin 406. As an example, the first coupling pin can be installed on the implement coupling hitch 216 and hooked onto the hook-shaped member 402 of the top coupling point 214. The implement coupling hitch 216 can be aligned with the bottom coupling point 212, and the second coupling pin 406 can be installed through the implement coupling hitch 216 and the via at the bottom coupling point 212 to couple the hitch 216 with the vertical load member 202.

As illustrated in FIG. 2, the exemplary hitch assembly 200 comprises a rear actuator 218 that comprises a first end 206 and second end 220. The first end 206 can comprise a coupling/pivot point that is pivotably coupled with the vertical load member 210 between the front end of the first portion 202 and the rear end of the second portion 208. The rear actuator 218 is coupled with the vertical load member 210 in a second pitch axis. Further, the second end 220 of the actuator 218 can comprise a coupling/pivot point that is operably, pivotably coupled to a rear axle frame portion 222 of the vehicle frame, at a point rearward of the rear axle 252 of the vehicle. The actuator 218 is operable to move the vertical load member 210 (e.g., up and down), resulting in the vertical load member 210 pivoting about the coupling 204 to the vehicle frame at the first portion 202 of the vertical load member 210. In this way, the implement attachment assembly 211 can be selectively raised and lowered at the rear end of the second portion 208 of the vertical load member 210. In some implementations, the rear actuator 218 can be used to lower and raise the load member 210 to facilitate attachment of the implement attachment assembly 211 to a target implement, for example, such as a scraper.

In one or more implementations, the rear actuator 218 can comprise one of: a hydraulic cylinder, a pneumatic cylinder, and an electrically operated actuator. That is, for example, a hydraulic cylinder can be remotely controlled to expand and retract the cylinder using a hydraulic pump; a hydraulic cylinder can be remotely controlled to expand and retract the cylinder using an air compressor or compressed air; and an electrically controlled actuator can be remotely operated to raise or lower the vertical load member 210 using electrical power.

Figure 3:
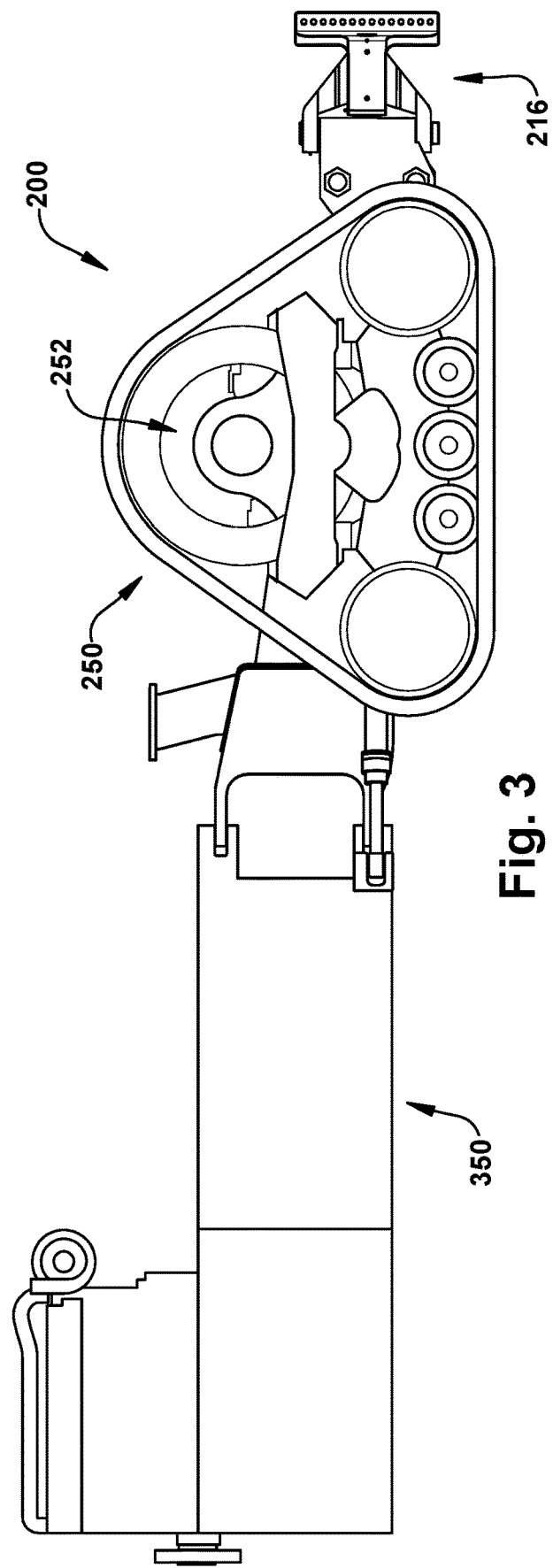
FIG. 3 is a component diagram illustrating another example implementation of one or more portions of one or more systems described herein.
Figure 7:
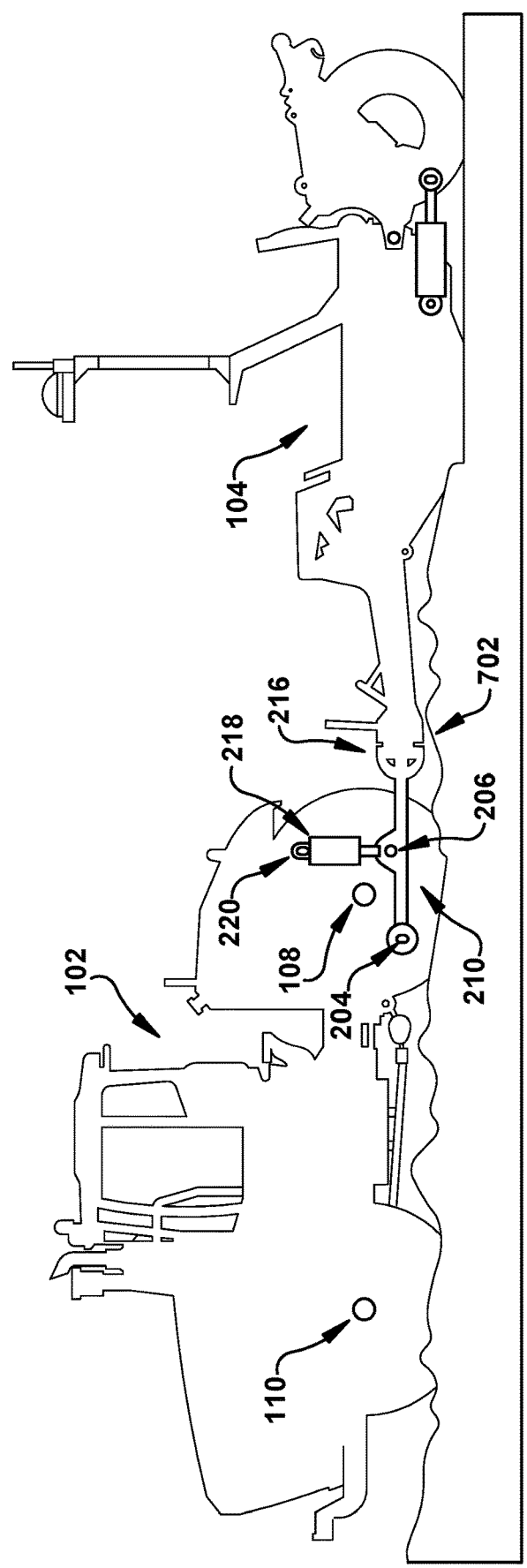
FIG. 7 is a component diagram illustrating one implementation of a system for adjusting the vertical downward force applied to a vehicle by an implement.

As an illustrative example, with reference to FIGS. 1, 3 and 7, the exemplary hitch assembly 200 can be disposed proximate the rear axle 108, 252 of an example vehicle 102 (e.g., coupled with a track system 250, or a wheel system), coupling with the rear frame of the vehicle 102, which is engaged with the chassis 350 and frame 254 of the vehicle 102. In this example, the implement coupling hitch 216 can be engaged with an implement coupler 702 disposed on a tongue or drawbar of the implement 104. Further, the rear actuator 218 is engaged with the rear frame 254 at the top end coupling point 220, and engaged with the vertical load member 210 at the bottom end coupling point 208. The vertical load member 210 is pivotably coupled with the rear vehicle frame 254 at the front coupling point 204, providing the second pitch axis pivot for the vertical load member 210.

In this example, the rear actuator 218 can raise the vertical load member 210, resulting in the vertical load member 210 pivoting about the coupling point 204, thereby lifting the front end of the implement 104 at the implement coupler 702. Further, the rear actuator 218 can lower the vertical load member 210, resulting in the vertical load member 210 pivoting about the coupling point 204, thereby lowering the front end of the implement 104 at the implement coupler 702. Additionally, because the vertical load member 210 is coupled with the vehicle's frame (at 204) at a point forward of the rear axle 108, 252, the raising and lowering of the vertical load member 210 results in an adjustment of the amount of vertical force applied by the implement to the coupling point 204 in front of the rear axle 108, 252.

In some implementations, the rear actuator 218 could comprise a chain, cable, or other member (e.g., metal bar, rope, hinged component, etc.). That is, for example, an actuator could be replaced with another non-actuating member that provides support for load member 210 to the rear-axle frame portion 222, such as when an implement (e.g., scraper) is not attached to the implement coupling hitch 216. In some implementations, the rear actuator 218 can be disposed in a type of float mode, where the actuator floats up and down with the up and down movement of the implement coupled with the vertical load member through the coupler 211. That is, for example, as the attached implement, such as a scraper, operably moves up and down over terrain, the vertical load member 210 will move up and down, and the rear actuator 218 can freely float up and down with the movement of the vertical load member 210.

Traditionally, an implement hitch is coupled to the vehicle frame at a point rear of the rear axle 108, 252, where the vertical load of the implement is applied to the vehicle frame rearward of the rear axle 108, 252. That traditional design results in an increased vertical load being applied to the rear axle 108, 252, and less vertical load applied to the front axle 110. The exemplary system 200, described herein, allows for the application of the implement's vertical load in front of the rear axle 108, 252, thereby shifting at least a portion of the load away from the rear axle 108, 252 and moving it to the front axle 110. In this way, for example, traction to the wheels or tracks of the front axle 110 can be improved, as more load is shifted forward. Further, for example, less mechanical load and stress is provided for the rear axle, as the load is shifted forward. Additionally, for example, because the rear actuator can selectively raise and/or lower the vertical load member, the amount and location, with respect to the vehicle frame, of the vertical load applied by the implement can be adjusted as desired to meet in-situ conditions.

Figure 4B:
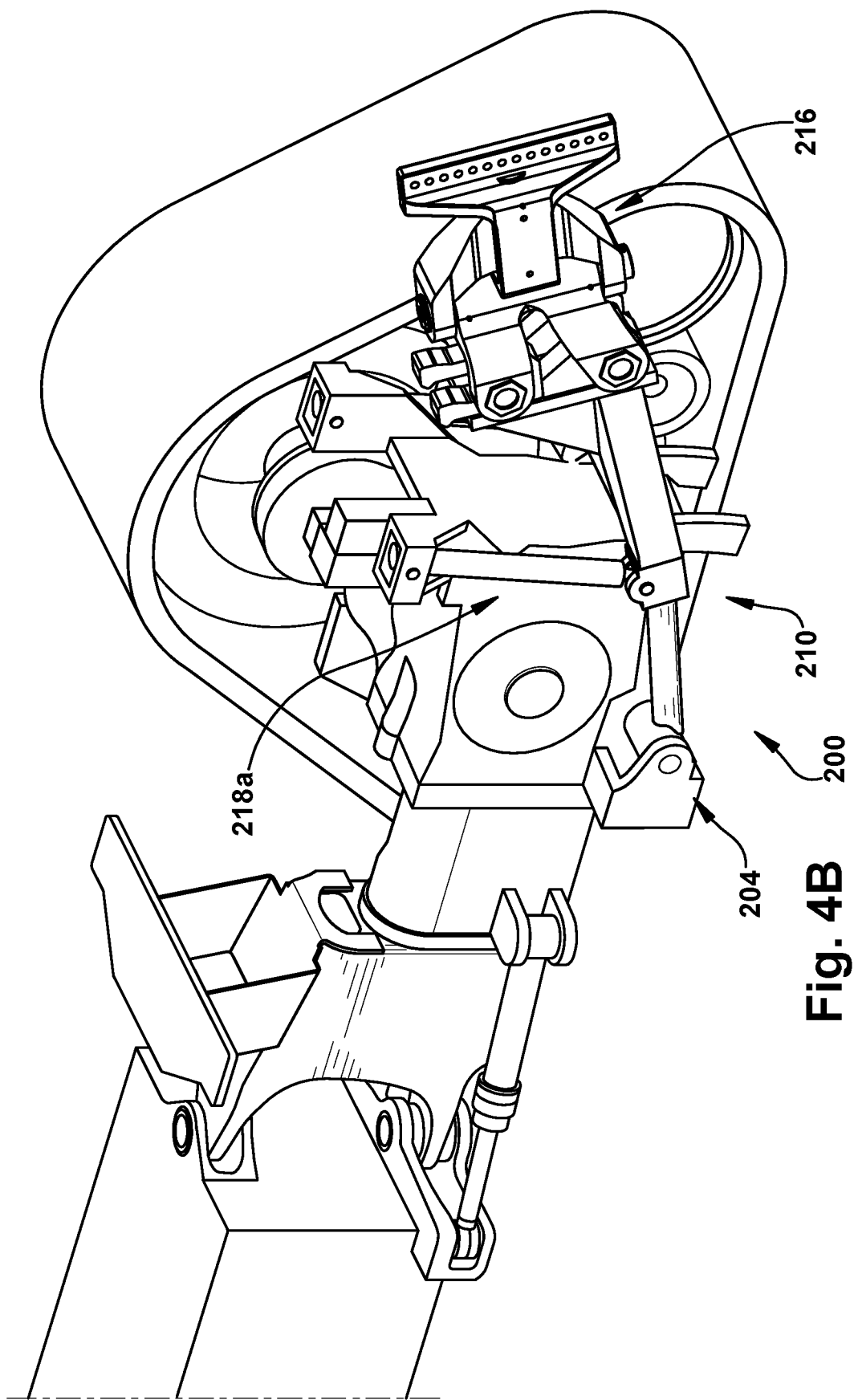
Figure 5:
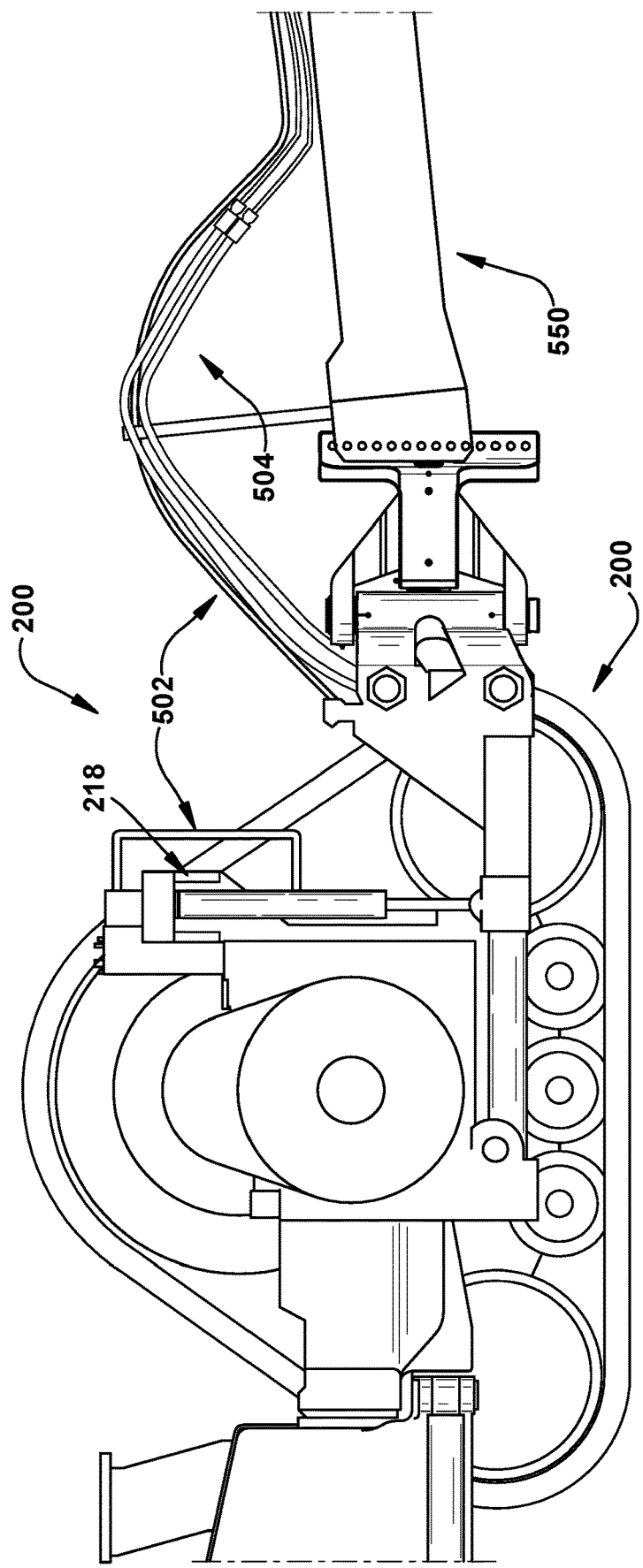
FIG. 5 is a component diagram illustrating another example implementation of one or more portions of one or more systems described herein.

As illustrated in FIGS. 4A and 4B, with continued reference to FIG. 2, in some implementations, the first portion 202 of the vertical load member 210 can comprise at least two arms 202a, 202b. In this implementation respective arms 202a, 202b can be operably, pivotably coupled with the vehicle frame 254 at the front end of the vertical load member 210. As illustrated, in this implementation, the respective arms 202a, 202b can be disposed on a different side of the rear axle 252, such as having arm 202a disposed on the left side, and arm 202b disposed on the right side. Further, as illustrated, the second portion 208 of the vertical load member 210 can comprise a plate that is fixedly engaged with the two arms 202a, 202b at a first end, and fixedly engaged with the implement attachment assembly 211 at a second, opposing end. As illustrated, in this implementation, the vertical load member 210 can comprise a sort of fork design, having the two or more arms 202a, 202b in the front, with the plate portion attached to the implement attachment assembly 211 at the rear.

As illustrated in FIGS. 4A and 4B, with continued reference to FIG. 2, in some implementations, the exemplary hitch assembly 200 can comprise two rear actuators 218a, 218b that are respectively, pivotably coupled with the vertical load member 210 at opposing sides of the vertical load member 210. As an example, as illustrated, a first rear actuator 218a can be coupled with the vertical load member 210 at a first actuator coupling point 206a, proximate the position where the first arm 202a is engaged with the plate of the rear portion 208. A second rear actuator 218b can be coupled with the vertical load member 210 at a second actuator coupling point 206b, proximate the position where the second arm 202b is engaged with the plate of the rear portion 208. Additionally, the first rear actuator 218a can be coupled with the rear vehicle frame 222 at a first frame-actuator coupling point 220a; and the second rear actuator 218b can be coupled with a second frame-actuator coupling point 220b.

In this way, for example, the vertical load applied by an attached implement may be substantially equally distributed between the left and right sides of the vehicle's frame. Further, in one or more implementations, the rear actuators 218a, 218b can comprise one of: a hydraulic cylinder, a pneumatic cylinder, and an electrically operated actuator. That is, for example, a hydraulic cylinder can be remotely controlled to expand and retract the cylinder using a hydraulic pump; a hydraulic cylinder can be remotely controlled to expand and retract the cylinder using an air compressor or compressed air; and an electrically controlled actuator can be remotely operated to raise or lower the vertical load member 210 using electrical power.

FIGS. 4A and 4B further illustrate an illustrative example of the exemplary hitch assembly 200 operating to shift a vertical load applied by a coupled implement. In this example, in FIG. 4A, the respective rear actuators 218a, 218b are disposed in an extended position. In this position, in this example, the vertical load member 210 pivots downward, where the front end of the front portion 202 remains coupled with the vehicle frame 254 at the member-frame coupling point 204, while the rear end of the rear portion 208, and the coupled hitch assembly 216, are disposed in a lowered position. As illustrated in FIG. 4B, the respective rear actuators 218 are disposed in a retracted position. In this position, in this example, the vertical load member 210 pivots upward, where the front end of the front portion 202 remains coupled with the vehicle frame 254 at the member-frame coupling point 204, while the rear end of the rear portion 208, and the coupled hitch assembly 216, are disposed in a raised position. In this way, for example, at least a portion of the vertical load applied by the implement to the vehicle frame can be shifted from the rear of the vehicle to the front of the vehicle.

As illustrated in FIGS. 2, 4A and 4B, the hitch assembly 200 can comprise a yaw pivot assembly 224 that is operably coupled with the implement attachment assembly 211. The yaw pivot assembly 224 can allow the coupled implement attachment assembly to pivot around a yaw axis with respect to a coupled implement. In some implementations, the yaw pivot assembly 224 may be comprise part of the implement attachment assembly 211. In other implementations, the yaw pivot assembly 224 may comprise part of the implement coupling hitch 216. In this way, the attached implement may be able to turn separately from the coupled vehicle, such as when cornering. Additionally, a yaw pivot pin 408 can be used to provide the yaw pivot for the yaw pivot assembly 224. In some implementations, the yaw pivot pin 408 can be selectably removable and replaceable in the yaw pivot assembly 224, such as to separate a front portion of the implement coupling hitch 216 from a rear portion of the implement coupling hitch 216.

As illustrated in FIGS. 2, 4A and 4B, the hitch assembly 200 can comprise a roll pivot assembly 226 that is operably engaged with the implement attachment assembly 211. The roll pivot assembly 226 can allow the coupled implement attachment assembly to pivot around a roll axis with respect to a coupled implement. In some implementations, the roll pivot assembly 226 may be comprise part of the implement attachment assembly 211. In other implementations, the yaw pivot assembly 226 may comprise part of the implement coupling hitch 216. In this way, the attached implement may be able roll from side-to-side separately from the coupled vehicle, such as when traversing uneven ground.

Figure 6:
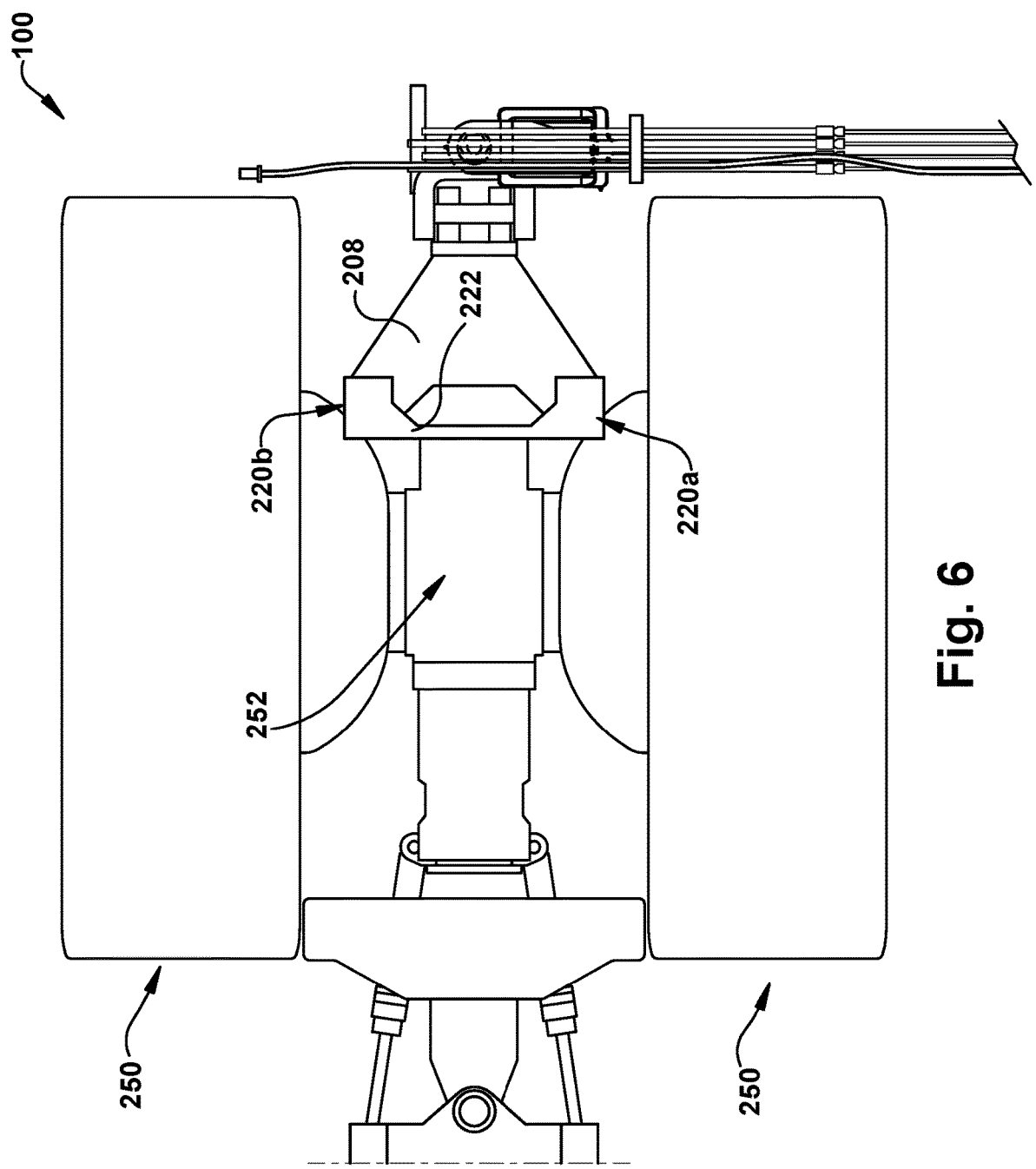
FIG. 6 is a component diagram illustrating one implementation of one or more portions of one or more systems described herein.

FIG. 6 illustrates a component diagram of an example implementation where one or more components may be used to control the actuator(s). In this example implementation, the actuator 218 comprises a cylinder (e.g., hydraulic, pneumatic, electric) that can be retracted and extended. A power line 502 provides power to the actuator to perform the retraction and extension action. The power line 502 can be coupled with a control unit that receives inputs from an operator to perform the appropriate action. As an example, the power line can comprise a hydraulic line that provides pressurized hydraulic fluid to a hydraulic cylinder (e.g., or pressurized air to a pneumatic cylinder, or electricity to an electric actuator). In some implementations, other communication lines 504 may be operably coupled with the example hitch assembly 200, such as coupled with one or more sensors (e.g., position, pressure, temperature, etc.), that provide situational information to a control unit. For example, the situational information may be used to identify an appropriate position for the vertical load member to be placed. In some implementations, the one or more communication and/or power line 502, 504 can also be coupled with the implement, such as running along the implement drawbar 550.

Figure 8:
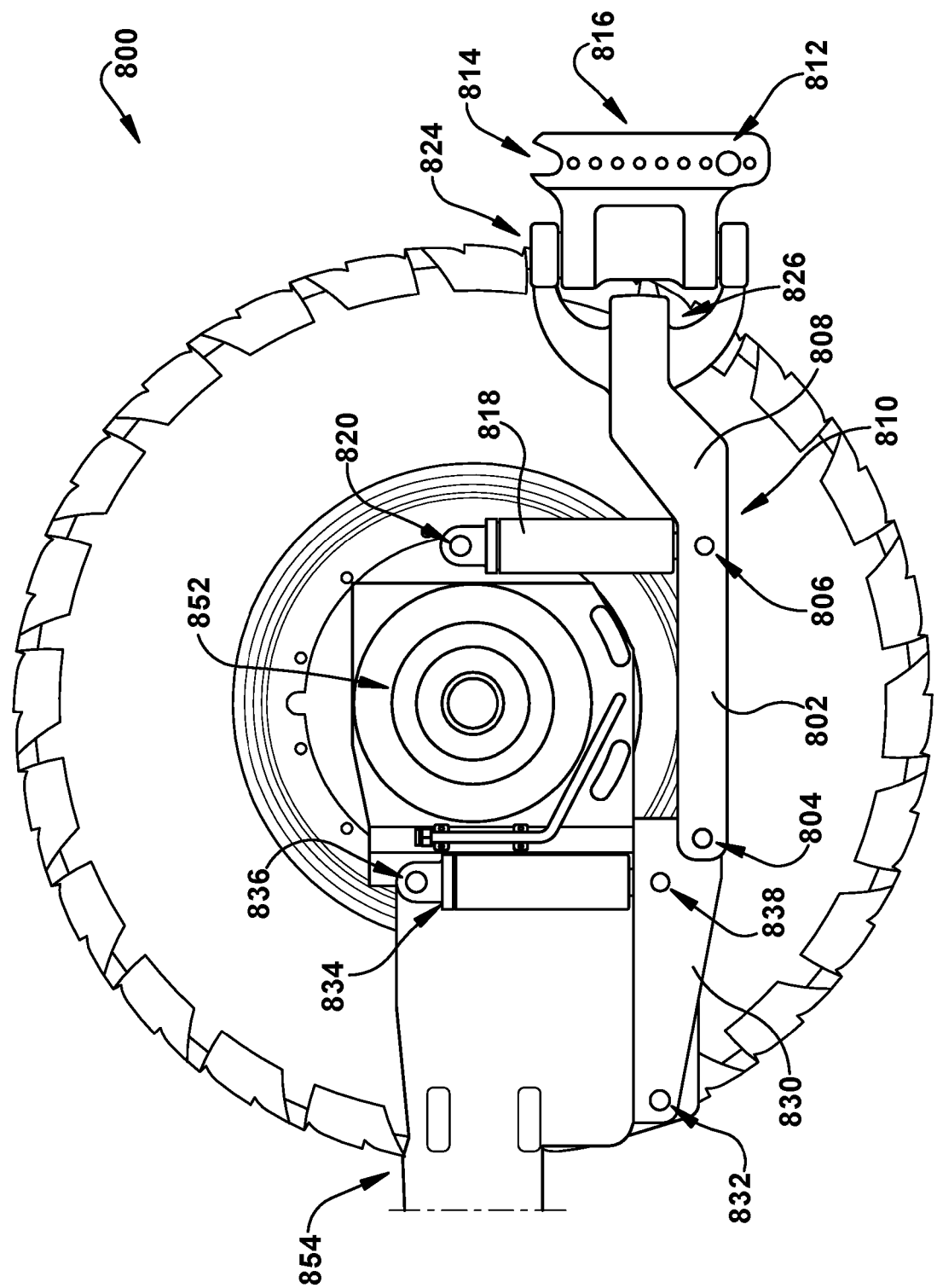
FIG. 8 is a component diagram illustrating an example alternate implementation of one or more portions of a system for varying vertical downward force load.

FIG. 8 is a component diagram illustrating an alternate implementation of a hitch assembly 800, which can be used to adjust the vertical load applied by a coupled implement to the vehicle frame. In this implementation, the example assembly 800 comprises a vertical load member 810, with a front portion 802 and a rear portion 808. A rear actuator 818 is engaged with the vertical load member 810 at a load member coupling point 806, and with the vehicle frame 854 at a frame coupling point 820. The rear portion 808 of the vertical load member 810 is engaged with a implement coupling attachment hitch 816, which comprises a bottom coupling point 812 and a top coupling point 814 (e.g., hook shaped), to couple with a implement hitch. The implement coupling attachment hitch 816 comprises a yaw pivot assembly 824, and a roll pivot assembly 826.

In this implementation 800, the vertical load member 810 can also comprise a dampener arm 830 that comprises a front end and a rear end. The dampener arm 830 can be configured to operably dampen oscillation of the vertical load member 810. The front end of the dampener arm 830 is pivotably coupled with the vehicle frame 854, and the rear end of the dampener arm 830 pivotably coupled with the front end of the front portion 802 of the vertical load member 810. Further, in this implementation, a second actuator 834 can be pivotably engaged with the dampener arm 830, and pivotally engaged with the vehicle frame 854 at a position forward of the rear axle 852.

For example, the dampener arm 830 is pivotably engaged with the front end of the front portion 802 of the vertical load member 810 at the front coupling point 804. The dampener arm 830 is pivotably coupled with the vehicle frame 854 at a front end coupling point 832 of the vertical load damping arm 830. Further, the front actuator 834 pivotably engages with the dampener arm 830 at a dampener arm coupling point 838, and with the frame 854 at a frame coupling point 836. In some implementations, a shock absorber may be utilized in place of the second actuator. That is, for example, instead of operably raising and lowering the dampener arm using the actuator 834, the shock absorber may merely mitigate up and down oscillation of the dampener arm during operation.

As an illustrative example, in operation, the front actuator 834 can be controlled remotely to extend or retract, resulting in a lowering or raising of the dampener arm, respectively. In this way, for example, an amount and/or location of at least a portion of the vertical load applied by the implement to the vehicle frame can be further adjusted.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A hitch assembly for coupling an implement to a vehicle, comprising:
    a vertical load member comprising a first portion at a front end and a second portion at a rear end, the vertical load member comprising a frame connection coupler at the first portion that is operably, pivotably coupled with a frame of a vehicle in a first pitch axis at a point forward of a rear axle of the vehicle;
    an implement attachment assembly disposed at the second portion of the vertical load member, the implement attachment assembly operably coupling with an implement attachment hitch coupling to an implement towed by the vehicle; and
    a rear actuator comprising a first end and second end, the first end pivotably coupled with the vertical load member between the front end and the rear end of the vertical load member in a second pitch axis, the second end of the actuator operably coupled to the vehicle frame at a point rearward of the rear axle of the vehicle, the actuator operable to move the vertical load member, resulting in the vertical load member pivoting about the coupling to the vehicle frame at the first portion of the vertical load member, and selectively raising and lowering the implement attachment assembly at the second portion of the vertical load member.

2. The hitch assembly of claim 1, the first portion of the vertical load member comprising two arms, respective arms operably, pivotably coupled with the vehicle frame at the front end of the vertical load member.

3. The hitch assembly of claim 2, the second portion comprising a plate fixedly engaged with the two arms at a front end, and fixedly engaged with the implement attachment assembly at a second opposing end.

4. The hitch assembly of claim 1, comprising two rear actuators, respective rear actuators pivotably coupled with the vertical load member at opposing sides of the vertical load member.

5. The hitch assembly of claim 1, the rear actuator comprising one of: a hydraulic cylinder, a pneumatic cylinder, and an electrically operated actuator.

6. The hitch assembly of claim 1, the implement attachment assembly comprising a vertically disposed member, the vertically disposed member comprising a top coupling point configured to engage with a first coupling pin to engage a first portion of the implement coupling hitch, and the vertically disposed member comprising a bottom coupling point configured to receive a second coupling pin to engage a second portion of the implement coupling hitch.

7. The hitch assembly of claim 6, the top coupling point comprising a hook-shaped member comprising a gap between a point and a shank of the hook-shape that is sized to receive the first coupling pin.

8. The hitch assembly of claim 6, the bottom coupling point comprising a via that is sized to receive the second coupling pin.

9. The hitch assembly of claim 1, the vertical load member comprising a dampener arm comprising a front end and a rear end, and configured to operably dampen oscillation of the vertical load member, the front end of the dampener arm pivotably coupled with the vehicle frame, the rear end of the dampener arm pivotably coupled with the front portion of the vertical load member.

10. The hitch assembly of claim 9, comprising a second actuator pivotably engaged with the dampener arm and pivotally engaged with the vehicle frame at a position forward of the rear axle.

11. The hitch assembly of claim 9, comprising a shock absorber pivotably engaged with the dampener arm and pivotally engaged with the vehicle frame at a position forward of the rear axle.

12. The hitch assembly of claim 1, comprising a yaw pivot assembly operably coupled with the implement attachment assembly, the yaw pivot assembly allowing the implement attachment assembly to pivot around a yaw axis with respect to the vertical load member.

13. The hitch assembly of claim 1, comprising a roll pivot assembly fixedly engaged with the implement attachment assembly, the roll pivot assembly allowing the implement attachment assembly to pivot around a roll axis with respect to the vertical load member.

14. A method for transferring a vertical load applied to a rear axle of a vehicle towing an implement at an implement hitch, wherein the vehicle comprises a vertical load member that comprises a first portion at a front end and a second portion at a rear end, wherein the vertical load member comprises a frame connection coupler at the first portion that is pivotably coupled with a frame of a vehicle in a first pitch axis at a point forward of a rear axle of the vehicle; and a rear actuator that comprises a first end and second end, wherein the first end is pivotably coupled with the vertical load member between the front end and the rear end of the vertical load member in a second pitch axis, and the second end of the actuator is coupled to the vehicle frame at a point rearward of the rear axle of the vehicle, the method comprising:
    activating the actuator to move the vertical load member, resulting in the vertical load member pivoting about the coupling to the vehicle frame at the first portion of the vertical load member, and resulting in selectively raising or lowering the implement attachment assembly at the second portion of the vertical load member;
    wherein lowering the vertical load member results in at least a portion of the vertical load applied to the rear axle transferring to a front axle of the vehicle; and
    wherein raising the vertical load member results in at least a portion of the vertical load applied to the front axle transferring to the rear axle of the vehicle.

15. The method of claim 14, activating the actuator to move the vertical load member comprising one or more of:
    extending the actuator to lower the vertical load member; and
    retracting the actuator to raise the vertical load member.

16. A system for transferring a vertical load applied to a rear axle of a vehicle towing an implement, comprising:
- a vehicle comprising a rear axle and a front axle;
- an implement operably coupled to the vehicle at an implement attachment hitch;
- a vertical load member comprising a front end and a rear end, the vertical load member operably, pivotably coupled to a frame of the vehicle in a first pitch axis at a point forward of a rear axle of the vehicle, wherein the implement attachment hitch is engaged with the vertical load member at the rear end;
- a rear actuator comprising a first end and second end, the first end pivotably coupled with the vertical load member between the front end and the rear end in a second pitch axis, the second end of the actuator operably coupled to the vehicle frame at a point rearward of the rear axle of the vehicle, the actuator operable to move the vertical load member, resulting in the vertical load member pivoting about the coupling to the vehicle frame at the first portion of the vertical load member, and selectively transferring a vertical load applied by the implement between the rear axle and the front axle.

17. The hitch assembly of claim 16, the vertical load member comprising two arms, respective arms operably, pivotably coupled with the vehicle frame at the front end of the vertical load member.

18. The hitch assembly of claim 17, the rear end of the vertical load member comprising a plate fixedly engaged with the two arms at a first end, and fixedly engaged with the implement attachment hitch at a second opposing end.

19. The hitch assembly of claim 16, comprising two rear actuators, respective rear actuators pivotably coupled with the vertical load member at opposing sides of the vertical load member.

20. The hitch assembly of claim 16, the rear actuator comprising one of: a hydraulic cylinder, a pneumatic cylinder, and an electrically operated actuator.

\* \* \* \* \*